J. E. GRAYBILL.
AUTOMATIC FLANGING MACHINE.
APPLICATION FILED APR. 17, 1908.
959,930.
Patented May 31, 1910.
2 SHEETS—SHEET 1.
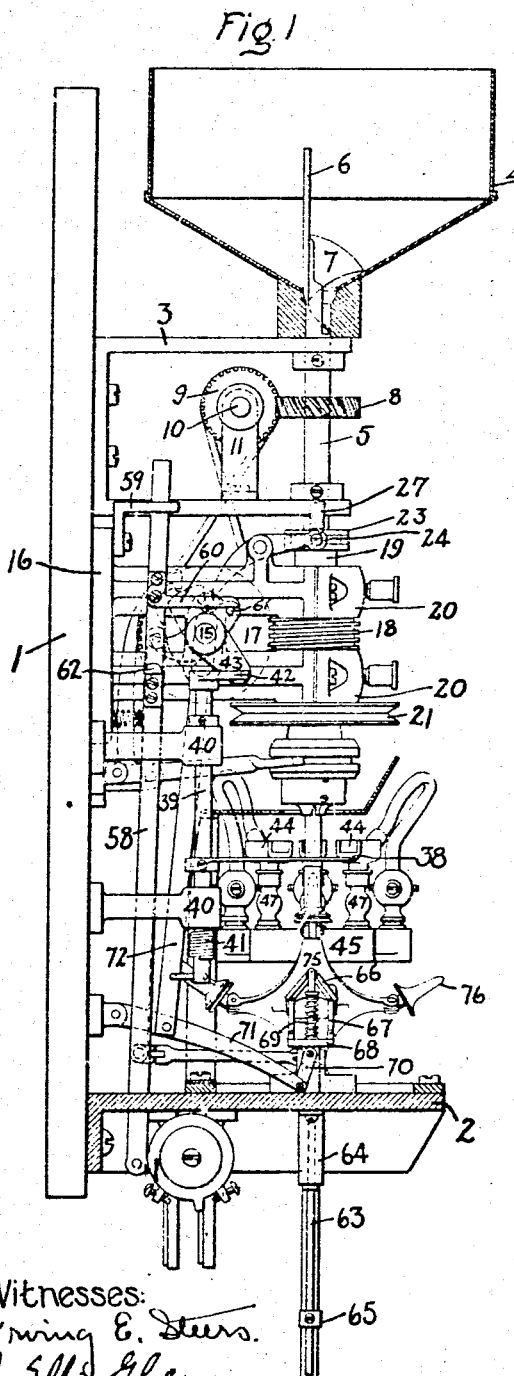
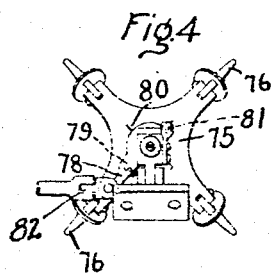
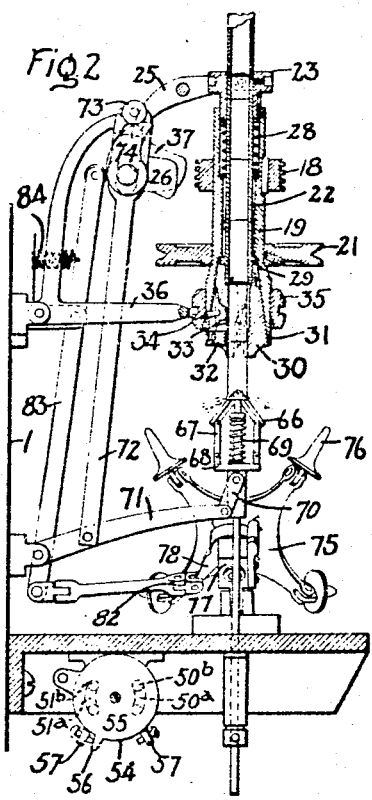
Witnesses:
Irving E. Steers.
J. Ellis Glen.
Inventor,
John E. Graybill
by Albert H. Dann
Atty.

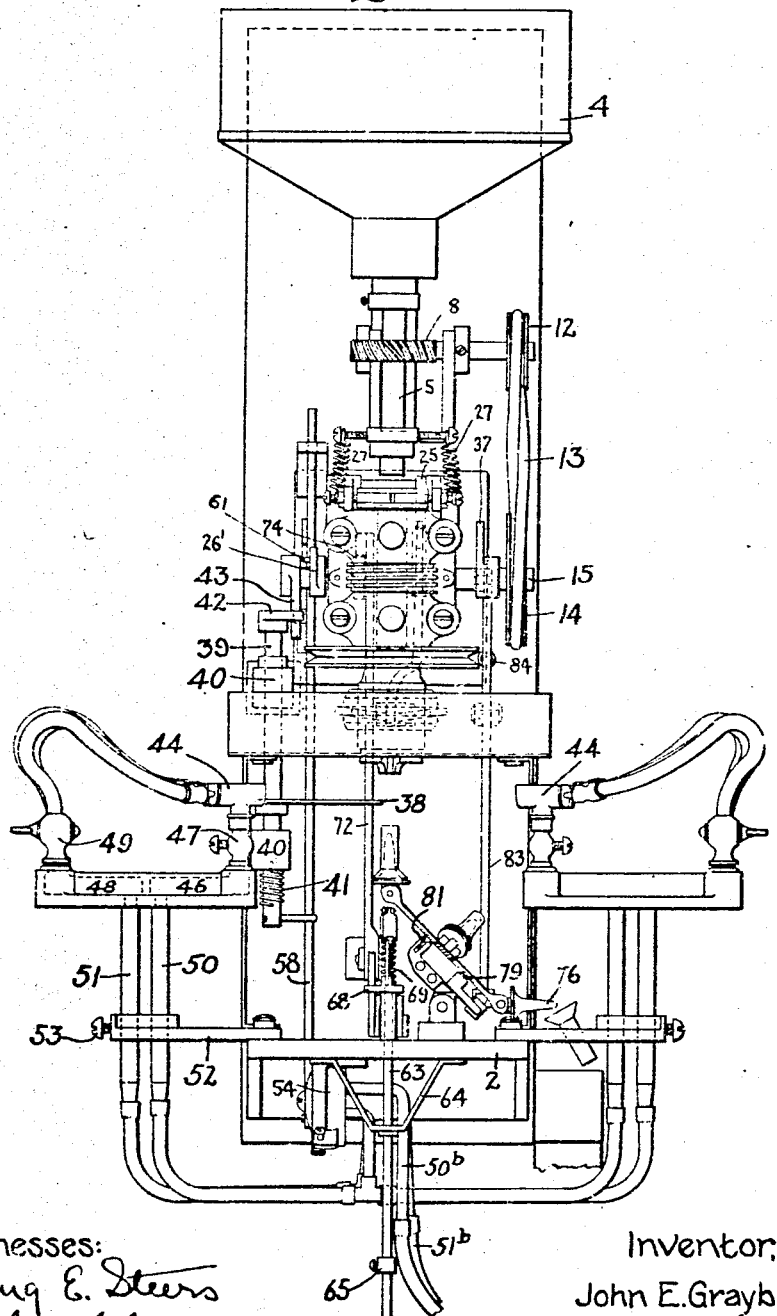

UNITED STATES PATENT OFFICE.

JOHN E. GRAYBILL, OF YORK, PENNSYLVANIA, ASSIGNOR TO GENERAL ELECTRIC COMPANY, A CORPORATION OF NEW YORK.

AUTOMATIC FLANGING-MACHINE.

959,930.  Specification of Letters Patent.  Patented May 31, 1910.

Application filed April 17, 1908. Serial No. 427,702.

*To all whom it may concern:*

Be it known that I, JOHN E. GRAYBILL, a citizen of the United States, residing at York, county of York, State of Pennsylvania, have invented certain new and useful Improvements in Automatic Flanging-Machines, of which the following is a specification.

This invention relates to machines for flanging the stems of incandescent lamps, and more particularly to machines in which the stems are automatically flanged and delivered into a receptacle without intervention on the part of the operator.

The object of the invention is to provide a simple and effective automatic device by means of which the lamp-stem may be flanged and delivered into a receptacle without requiring any attention or skill from the operator, in which the tubes for the stems may be placed in a hopper from which they are fed continually and automatically as required, in which a clutch or chuck for holding the tubes in flanging position also controls the feed of the other tubes; and which is in general an improvement on machines of a similar type.

In carrying out my invention a flanging mechanism with a vertical hollow driving shaft is preferably used, and the tubes are continuously fed into the upper end of the shaft from a hopper by means of a suitable feeding mechanism, preferably a device connected to the shaft and operating in the hopper to stand the tubes one at a time on end in the upper end of the shaft through which they pass to be flanged. The lower end of the shaft carries a chuck which holds a tube in flanging position and preferably also holds back the tubes in the shaft when the chuck opens to drop the flanged tube, and afterward permits the tubes in the shaft to feed downward until the lowermost one engages a stop and is held until the chuck grips it. The tube is flanged by a flanging device which moves toward the tube held in the chuck. The flanged tubes are received on a carrier which deposits them in a receptacle. Both the carrier and the flanging device are driven from cams and are so timed that they do not interfere.

In the accompanying drawings, which are merely an illustration of one embodiment of the invention, Figure 1 is a side view of the machine, showing the hopper for the stems in section; Fig. 2 a similar view with the hopper removed and the clutches for the stems shown in section; Fig. 3 a front view of the machine shown in Fig. 1; and Fig. 4 a view in perspective of the delivering mechanism for the flanged stems.

In the embodiment of my invention shown in the drawings the various parts of the machine are mounted on a vertical support 1 and a horizontal platform 2 attached to the support 1. A U-shaped bracket 3 secured in a horizontal position to the vertical support 1 carries on the upper arm a hopper, in which the stems, consisting of short pieces of glass tubing, are placed. By means of any suitable feed mechanism the stems are delivered in a vertical position and one at a time to the interior of a constantly revolving shaft 5 journaled in suitable bearings on the bracket 3 and having an interior diameter slightly greater than the outer diameter of the stems. The preferred mechanism comprises a screw conveyer placed in the bottom of the hopper and consisting of an agitator 6 for stirring up the tubes and of a vane 7 set transversely of the constantly revolving shaft 5 with its tip engaging the bottom of the hopper and so shaped that it engages a stem and raises it to the upright position, in line with the hollow shaft, whereupon the stem drops into the interior of the shaft and passes down toward flanging position. A spiral driving gear 8 mounted on the shaft 5 meshes with a spiral gear 9 on a countershaft 10 which is suitably mounted in journals 11 secured to the bracket 3 and carries a driving pulley 12 rotated by means of a belt 13 from a driving pulley 14 keyed to a constantly rotating cam-shaft 15. A camshaft bracket 16 on the vertical support 1 carries the cam-shaft 15, which is driven through a spiral gear wheel 17 secured thereto and meshing with a spiral gear 18 mounted upon and driven by a hollow shaft 19 carried in journals 20 on the bracket 16 and rotated by means of a driving pulley 21 driven from any suitable source of power. The stems pass into the hollow shaft 5 in a vertical position and end to end and then pass through an inner tube 22 splined in the hollow shaft 19.

The mechanism shown in the drawings for giving an endwise movement to the inner tube 22 comprises a collar 23 secured to the upper end of the tube 22 and provided with a groove which is engaged by forks 24 carried upon an actuating lever 25 which in turn is moved at the proper time by means of a cam 26 carried upon the cam-shaft 15 in a position to engage the lever 25. The inner tube 22 is normally held in the position shown in Fig. 2 by means of springs 27 which engage a stud on the bracket 3 and a corresponding stud on the end of the actuating lever 25, and also by means of a compression spring 28 surrounding the tube 22 with one end in engagement with a shoulder in the shaft 19 and the other end in engagement with the collar 23 on the tube 22. A shoulder 29 on the lower end of the inner tube 22 engages a corresponding shoulder in the hollow shaft 19 and determines the normal position of the tube 22. The stems pass down through the inner tube 22 and at the lower end thereof are gripped by a primary gripping clutch with a set of jaws 30 connected by means of pins to the lower end of the tube 22.

As shown in Fig. 2, the outer surface of the jaws 30 is conical and coöperates with the interior conical surface of a shell 31 formed on the end of the hollow shaft 19 so that longitudinal movement of the jaws 30 with relation to the shell 31 will cause them to approach or to recede from each other, depending upon the direction of motion. When the parts are in the position shown in Fig. 2 with the tube 22 in normal position, the jaws 30 of the primary clutch firmly grasp one end of the stem which has passed down through the tube 22 and hold it in flanging position. The shell 31 carries near the lower edge projections 32 which extend between the jaws 30 in the primary clutch and act as a support for a loose jaw 33 of a secondary clutch which engages the tube in the shaft immediately above or adjacent to the tube in flanging position. The secondary clutch jaw is moved by means of an actuating pin 34 securely attached thereto and projecting through an opening in the shell 31 into engagement with a slip-collar 35 slidably mounted upon the outer cylindrical surface of the shell 31. The lower inner edge of the collar 35 is cut away, as shown in Fig. 2, to form a conical surface, and when the collar is in the position shown in Fig. 2, the jaw 33 of the secondary clutch is brought into operative position and into engagement with one of the stems contained in the inner tube 22. The slip-collar 35 is moved upon the shell 31 by means of an actuating bell-crank lever 36 pivotally supported upon the vertical support 1 and actuated at the proper time by means of a cam 26 carried upon a cam-shaft 15. When the parts of the clutch are in the position shown in Fig. 2, the upper end of the stem which is being flanged is firmly gripped by the jaws 30 of the primary clutch; while the next stem immediately above is firmly gripped by the jaws 33 of the secondary clutch. After the flanging is completed, the inner tube 22 may be moved downward, thereby permitting the jaws 30 of the primary clutch to move apart to release the flanged stem without causing the release of the stem held by the secondary clutch 33, since the position of the jaws of the secondary clutch depends upon the relation between the shell 31 and the slip-collar 35, and the cams are so set that during the entire downward movement of said tube the jaw 33 is in firm engagement with the stem held by it.

The stem to be flanged is brought into the proper position through being released by both the primary and secondary clutches and dropping by gravity. The extent to which the stem can move downward is controlled by a stop 38 moved into the position shown in Fig. 1 before the secondary clutch 33 is released, so that the stems in the hollow shaft can move downward only until they are stopped by engaging the stop 38. The inner tube 22 is then actuated to cause the primary clutch to grip the upper end of the stem which is in engagement with the stop 38, after which the stop is moved to one side by any suitable mechanism.

The arrangement shown in the drawings for operating the stop consists of a rock-shaft 39, carried in suitable bearings 40 and rocked to a position where the stop 38 is out of line by a spiral spring 41 surrounding the rock-shaft with one end attached thereto while the other end is connected to one of the bearings 40. The rock-shaft is positively moved so as to bring the stop 38 into operative position by means of a crank 42 keyed to the upper end and engaged by a finger 43 mounted upon the cam-shaft 15.

A stem is ready to be flanged after it has has dropped into engagement with the stop 38, the upper end thereof has been firmly grasped by the primary clutch and the stop 38 has been moved to one side. When the upper end of the stem is gripped by the jaws 30 of the primary clutch the lower end is in the position to be heated by burners 44 carried upon supports 45, each of which is divided into two compartments, one compartment 46 supplying gas to the burners through a regulating valve 47, while the other compartment 48 supplies compressed air to the burners through a regulating valve 49.

Gas is supplied to the compartment 46 through a gas-pipe 50 and air is supplied to the compartment 48 through an air pipe 51; both of which pipes are carried in and supported by a bracket 52. The pipes 50 and 51 are made to act as supports for the support 45, and are vertically adjustable in relation to the bracket 52, being held in adjusted position by a set-screw 53 carried in the bracket 52 and engaging the pipe 51. The burners 44, therefore, can be adjusted in a vertical plane so as to bring the flame of the burner upon any desired part of a stem held by the primary clutch. The supply of air and gas to the burners is controlled by a regulating valve 54 which may be of any suitable form, but is shown in the drawing as consisting of a disk 55 rotatably mounted upon a stationary seat and carrying a lug 56 which engages stop lugs 57 upon the stationary seat. The lugs 56 and 57, therefore, determine the extent of movement of the disk of the controlling valve. The air and gas pipes 50 and 51 lead to ports in the valve seat of the controlling valve and in one position of the valve disk 55 these ports are connected through a gas port $50^a$ and an air port $51^a$ cut in the valve disk with a gas supply pipe $50^b$ and an air supply pipe $51^b$, which are connected to ports in the stationary valve seat.

When the valve disk is in the position shown in Fig. 2, air and gas can flow from the pipes $50^b$ and $51^b$, through the recesses in the valve disk 55 and the ports in the stationary valve seat to the pipes 50 and 51 and thence to the burners. When the valve disk 55 is shifted so that the lug 56 is in engagement with the other lug 57, the supply of air and gas to the burners is diminished, leaving only a pilot flame. The valve is shifted at the proper time by means of an actuating rod 58 attached thereto and having its upper end slidably mounted in a guide 59 carried upon the support 1. The rod 58 has an arm 60 extending at right angles thereto in a position to be engaged by a pin 61, carried upon the cam 26' mounted on a cam-shaft 15. As the cam-shaft 15 rotates, therefore, the pin 61 engages the arm 60 and moves the actuating rod 58 so as to bring the valve disk 55 into the position shown in Fig. 2, thereby supplying air and gas to the burners. The actuating rod 58 also carries a projection 62 in a position to be engaged by the cam 43 which thereby moves the rod 58 so as to throw the valve disk 55 to the position shown in Fig. 1 in which the supply of the gas to the burners is diminished, leaving only a pilot flame.

The stem which is held by its upper end in the primary clutch is rotated in the flame of the burners until the lower end thereof reaches the proper temperature, when it is formed into a flange by a flanging device automatically brought into proper relation thereto. The flanging mechanism shown in the drawings comprises a vertically-movable rod 63 slidably mounted in a guide 64 carried upon the platform 2 and carrying a stop collar 65 for engaging the lower end of the guide when the rod 63 reaches its upward limit of movement. The end of the stem is flared out to form a flange by means of flanging arms 66, each pivoted at one end in the upper end of the rod 63 and connected at its other end to a link 67 which in turn is pivotally connected to a sliding frame 68 loosely mounted upon and guided by the rod 63.

A compression spring 69 surrounds the rod 63 and has one end in engagement with the sliding frame 68, and the other end in engagement with a collar firmly mounted upon the rod 63. This spring normally holds the flanging arms in the position shown in Fig. 2. The sliding frame 68 and the mechanism connected thereto is lifted into operative position by means of links 70 pivotally secured to the flanging frame and also to one end of a pivoted arm 71; the other end of which is mounted on the vertical support 1. The arm 71 is moved at the proper time and to the proper distance by means of an actuating link 72, one end of which is connected to the arm 71 and the other end of which is forked to embrace the cam-shaft 15 and carries a roller 73 coöperating with a cam 74 upon the cam-shaft 15. The cam 74 is so proportioned that the first part of its movement lifts the flanging mechanism into the position shown in Fig. 1 with the stop collar 65 on the rod 63 in engagement with the lower end of the guide 64. Further movement of the cam lifts the sliding frame 68, thereby compressing the spring 69 and causing a relative movement between the rod 63 and the frame. As a result of this movement the flanging arms 66 are moved to the position shown in dotted lines in Fig. 2, in which position the lower end of the stem is formed into a flange. The cam 74 then releases the flanging mechanism which drops back to the inoperative position shown in Fig. 1.

At the conclusion of the series of operations above described, the stem is properly flanged and is firmly held by the upper end in the primary clutch. The completed flanged stem may be delivered to a suitable receptacle by any suitable form of delivery mechanism. The mechanism for this purpose shown in the drawings comprises a rotating plate or carrier 75 provided with a plurality of pivotally mounted metal pins 76 covered with asbestos. These carriers are formed to receive and hold the flanged stem when it is released by the primary clutch. The rotating plate 75 is mounted in a suitable bearing 77 and is moved by a step-by-step motion so as to bring the carriers 76 one after another into position to receive the flanged stem when it is released by the primary clutch. The step-by-step motion is given to the rotating plate by means of an oscillating arm 78 which oscillates about the shaft of the plate 75 and carries a spring-pressed pin 79 coöperating with ratchet teeth 80 upon the plate 75. A spring-pressed pin 81 mounted upon the bearing 77 also cooperates with the ratchet teeth 80 to prevent backward movement of the rotating plate. The oscillating arm 78 is connected by means of link-work 82 to an actuating lever 83, normally held in the position shown in Fig. 2 by means of a compression spring 84, one end of which engages the support 1 and the other end engages the lever. The actuating lever is moved at the proper time by means of the cam 37 upon the cam-shaft 15 which has previously actuated the primary clutch to release a flanged tube and permit a fresh tube to drop into flanging position. The ratchet teeth on the plate 75 and the spring-pressed pin 81 are so related that the plate stops for an instant and is held with one of the pins 76 in position to receive the flanged stem. An oscillation of the arm 78 causes the rotating plate to advance one step which brings the next pin 76 into position to receive the flanged stem. Further movement of cam throws pin 76 forward one step and out of the way of flanging device. The flanged stems are released from the pin and drop off into a suitable receptacle, as shown in Fig. 3, when the pin reaches the proper position.

The operation of the machine is as follows: The stems consisting of glass tubes of the proper length are put in the hopper and, by means of the screw conveyer in the bottom of the hopper, are fed into the rotating shaft 5, one at a time and end to end. The stems pass down into the inner tube 22 and drop through the primary and secondary clutches until the lowermost stem is stopped by coming into engagement with the stop 38. This movement is permitted by the endwise movement of the inner tube 22 downward which causes the jaws 30 of the primary clutch to separate and to permit the stems to drop freely through the clutch. When the lowermost stem is in engagement with the stop 38, the cam 26 moves out of engagement with the actuating lever 25 and permits the inner tube 22 to move upward under the influence of the springs 27 and 28. This movement of the clutch jaws 30 with relation to the sleeves 31 brings those jaws into engagement with the upper end of the stem which is held by the stop 38. The stop 38 is then removed by the action of the crank 42 and the finger 43, and the stem is held in the primary clutch which is continuously rotated by the driving pulley 21. The lower end of the rotating stem is in range of the burners 44, and the supply of gas and air is now delivered to the burners by the controlling valve 54, which is operated through the actuating rod 58 by the pin 61 driven from the crank-shaft 15. After the burners have heated the lower end of the rotating stem to the proper temperature, the actuating rod 58 is moved downward, thereby shutting off part of the supply of gas and all of the air to the burners. The flanging mechanism is now raised into engagement with the rotating stem, the lower end of which is plastic, and, as the flanging arms 66 are moved to the position shown in dotted lines in Fig. 2, the lower end of the stem is formed into a flange. The flanging mechanism then drops back to the inoperative position and the rotating plate 75 is moved to bring a pin 76 into line with the flanged stem which at this moment is released by the primary clutch pin, due to the downward movement of the inner tube 22 caused by the engagement of the cam 26 with the lever 25, and drops upon the pin. At the time this downward movement takes place the remaining stems in the inner tube 22 are prevented from dropping by the action of the secondary clutch 33 which is held in clutching engagement with the lowermost stem in the inner tube 22 and the primary clutch by the action of the sliding collar 35. The rotating plate 75 moves on, carrying the flanged stem out of line with the inner tube 22 and the stop 38 moves back into operative position as shown in Fig. 1. The inner tube 22 is still depressed by the action of the cam 26, hence the primary clutch is open. The sliding collar 35 is now moved upon the sleeve 31 to release the jaw 33 of the secondary clutch. This movement permits the stems contained in the inner tube 22 and the hollow shaft 5 to drop downward a distance equal to the length of one stem, which movement brings the lower end of the bottom stem into engagement with the stop 38. The slidable collar 35 then moves back to the position shown in Fig. 2, gripping the stem immediately above the bottom stem and at the same time the inner tube 22 moves upward under the influence of springs 28 and 27, thereby causing the jaws 30 to grip the upper end of the lowermost stem. The operations above described are then repeated and another stem is flanged.

What I claim as new and desire to secure by Letters Patent of the United States, is,—

1. In a machine for flanging tubes, the combination with a hopper for the tubes, of a flanging mechanism having a vertical hollow shaft extending through the bottom of the hopper, and a curved vane mounted on the shaft, said vane having one edge in alinement with the shaft and another edge in engagement with the bottom of the hopper and being shaped to stand the tubes on end in the opening in the shaft.

2. In a machine for flanging tubes, the combination with a hopper for the tubes, of a flanging mechanism having a vertical hollow shaft extending through the bottom of the hopper, and a vane mounted on the shaft with one edge in alinement with the shaft and another edge shaped to fit the bottom of the hopper, said vane being curved to cause it to feed one end of a tube into the shaft and to stand the tube on end.

3. In a machine for flanging tubes, the combination with a hopper having a conical bottom, of a flanging mechanism having a hollow shaft with the open end at the apex of the bottom of the hopper, and a vane mounted on the shaft with one edge in alinement with the shaft and another edge shaped to fit the bottom of the hopper, whereby the tubes are fed one at a time into the tube.

4. In a tube flanging machine, the combination with a hollow shaft for receiving the tubes, of a chuck at one end of the shaft having one set of jaws for holding the tube in position to be flanged, and a second set of jaws for preventing a movement of the other tubes along the shaft while the first set of jaws is open for releasing the flanged tube, and automatic actuating mechanism for the jaws of said chuck.

5. In a tube flanging machine, the combination with a vertical hollow shaft for receiving the tube to be flanged, of a rotatable chuck having two sets of jaws mounted at different points along the axis of the chuck to grip the device in said shaft, and means for operating said sets of jaws in predetermined sequence.

6. In a tube flanging machine, the combination with a vertical hollow shaft for receiving the tubes, of a chuck at the lower end of the shaft having a jaw for gripping the tube to be flanged and a second jaw for gripping the adjacent tube in the shaft, and means for operating said jaws in sequence.

7. In a tube flanging machine, the combination with a vertical hollow shaft for receiving the tubes, of a chuck at the lower end of the tube having a gripping jaw for holding the flanged tube and a secondary jaw for holding the tube immediately above the flanged tube, and actuating means for opening the gripping jaw and the secondary jaw in succession and then closing the gripping jaw and the secondary jaw in succession.

8. In a tube flanging machine, the combination with a vertical hollow shaft for receiving the tube to be flanged, of a chuck at the lower end of the shaft having two sets of jaws for gripping the tubes, a stop movable into alinement with the shaft to a point below the chuck and closer to the chuck than the length of a tube, and automatic means for actuating the jaws of the chuck and said stop in predetermined sequence.

9. In a tube flanging machine, the combination with a vertical hollow shaft for receiving the tubes, of a chuck having a gripping jaw for the tube in flanging position and a secondary jaw for the adjacent tube actuated by a movement relative to the shaft, and actuating means for moving each of said jaws relatively to the shaft.

10. In a tube flanging machine, the combination with a rotatable shaft having a shell on the lower end cylindrical on the outside and conical on the inside, of a tapered gripping jaw longitudinally movable inside of said chuck, a secondary jaw projecting into said shell to engage a tube therein, and a longitudinally movable member mounted on the exterior of said shell to control the secondary jaw.

11. In a tube flanging machine, the combination with a tube flanging mechanism, of a movable carrier having pins to receive the flanged tubes, and means for moving the carrier to bring a pin into position to receive each flanged tube when released by the flanging mechanism.

12. In a tube flanging machine, the combination with a chuck for holding the flanged tubes, of a rotatable spider having pins brought into line with the flanged tubes, and actuating means for said chuck and spider for rotating the spider to bring a pin into line with the flanged tube when released by the chuck.

13. In a tube flanging machine, the combination with a chuck for holding the flanged tube, of a rotatable carrier mounted at an angle to the axis of the tube held by the chuck, pins on said carrier to receive said tube, and actuating means for said chuck and carrier for intermittently rotating said carrier to bring a pin into alinement with the tube as the chuck releases the tube.

14. In a tube flanging machine, the combination with a chuck for holding the tube and a flanging device movable into engagement with the tube to flange it, of a movable carrier mounted out of the path of the flanging device, and having pins carried into alinement with the chuck to receive the flanged tube.

15. In a tube flanging machine, the combination with a chuck for holding the tube and a flanging device movable into engagement with the tube to flange it, of a movable carrier mounted out of the path of the flanging device, pins thereon movable across the path of the flanging device to receive the flanged tube, and means for normally holding the carrier with the pins out of the path of the flanging device.

16. In a tube flanging machine, the combination with a chuck for holding the tube and a flanging device movable into engagement with the tube to flange it, of a rotatable carrier having arms movable between the flanging device and the chuck to receive the flanged tubes, and actuating means for moving said carrier in predetermined relation to said flanging device.

17. In a tube flanging machine, the combination with a chuck for holding the tube and a flanging device movable into engagement with the tube to flange it, of a carrier having a plurality of arms mounted to move between the flanging device and the chuck to receive the flanged tubes, and actuating means for moving said carrier while the flanging device is inoperative.

18. In a tube flanging machine, the combination with a chuck for the tube to be flanged, of a flanging device movable toward the chuck to flange the tube, a carrier movable between said device and said chuck to receive the flanged tube, and a cam for operating said device and said carrier in succession.

In witness whereof, I have hereunto set my hand this fourteenth day of April, 1908.

JOHN E. GRAYBILL.

Witnesses:
   EDWARD J. LOUCKS,
   ADA ALLISON.